US008943045B2

(12) United States Patent
Murthy

(10) Patent No.: US 8,943,045 B2
(45) Date of Patent: Jan. 27, 2015

(54) MECHANISMS FOR EFFICIENT AUTOCOMPLETION IN XML SEARCH APPLICATIONS

(75) Inventor: Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1498 days.

(21) Appl. No.: 12/360,919

(22) Filed: Jan. 28, 2009

(65) Prior Publication Data

US 2010/0191721 A1    Jul. 29, 2010

(51) Int. Cl.
*G06F 17/30* (2006.01)
*G06F 7/00* (2006.01)
*G06F 17/27* (2006.01)

(52) U.S. Cl.
CPC ........ *G06F 17/30938* (2013.01); *G06F 17/276* (2013.01)
USPC .......................................... 707/723; 707/796

(58) Field of Classification Search
CPC .. G06F 17/241; G06F 17/30923; G06F 17/30
USPC ................................................. 707/723, 796
See application file for complete search history.

(56) References Cited

U.S. PATENT DOCUMENTS

| | | | | |
|---|---|---|---|---|
| 6,502,101 | B1 * | 12/2002 | Verprauskus et al. | 707/999.006 |
| 7,162,485 | B2 * | 1/2007 | Gottlob et al. | 707/769 |
| 7,500,184 | B2 * | 3/2009 | Kamiya | 715/234 |
| 7,502,995 | B2 * | 3/2009 | Takagi et al. | 715/234 |
| 7,562,087 | B2 * | 7/2009 | Harvey et al. | 1/1 |
| 7,627,604 | B2 * | 12/2009 | Furusho | 707/999.003 |
| 7,664,727 | B2 * | 2/2010 | Van Doan et al. | 707/797 |
| 7,720,868 | B2 * | 5/2010 | Mauceri et al. | 707/796 |
| 7,937,399 | B2 * | 5/2011 | Furusho | 707/758 |
| 2002/0116371 | A1 * | 8/2002 | Dodds et al. | 707/3 |
| 2003/0014397 | A1 * | 1/2003 | Chau et al. | 707/3 |
| 2004/0060007 | A1 * | 3/2004 | Gottlob et al. | 707/3 |
| 2004/0243555 | A1 * | 12/2004 | Bolsius et al. | 707/3 |

(Continued)

OTHER PUBLICATIONS

Xpath Syntax. W3 Schools[online]. Retrieved from the Internet<URL: http://www.w3schools.com/xpath/xpath_syntax.asp>.*

*Primary Examiner* — Pavan Mamillapalli
(74) *Attorney, Agent, or Firm* — Hickman Palermo Truong Becker Bingham Wong LLP

(57) ABSTRACT

Mechanisms are described for providing auto-completion capability in a user interface that allows users to search for XML tags and data in a collection of XML documents. A user searching for data in XML documents might not be aware of the entire structure of the data. A path context may be specified for narrowing the search to a particular set of nodes within the documents in the collection. When the user is in the process of typing in an XML tag name, but prior to submitting the tag name to the search engine, the user interface presents an ordered list of completed XML tags that match the prefix typed by the user. The order of the tags in the list reflects the frequency of the completed tags found within the specified path context of the collection of documents. Likewise, when the user is in the process of typing a string of text to be searched for within the value of XML nodes in the set of documents, but prior to submitting the test string to the search engine, the user interface presents an ordered list of completed text strings that match the partially specified text, where the order of the completed text strings reflects their frequency within the specified path context in the collection of documents.

14 Claims, 7 Drawing Sheets

(56) References Cited

U.S. PATENT DOCUMENTS

| | | |
|---|---|---|
| 2006/0100989 A1* | 5/2006 | Chinchwadkar et al. .......... 707/3 |
| 2006/0184873 A1* | 8/2006 | Kamiya ........................ 715/513 |
| 2007/0073734 A1* | 3/2007 | Doan et al. .................... 707/100 |
| 2007/0174247 A1* | 7/2007 | Xu et al. ............................ 707/3 |
| 2008/0154893 A1* | 6/2008 | Ting et al. ......................... 707/6 |
| 2008/0215583 A1* | 9/2008 | Gunawardena et al. .......... 707/7 |
| 2009/0030869 A1* | 1/2009 | Aharoni et al. ................... 707/1 |
| 2009/0240712 A1* | 9/2009 | Murthy ........................ 707/100 |
| 2010/0235296 A1* | 9/2010 | Nakazato ..................... 705/348 |

\* cited by examiner

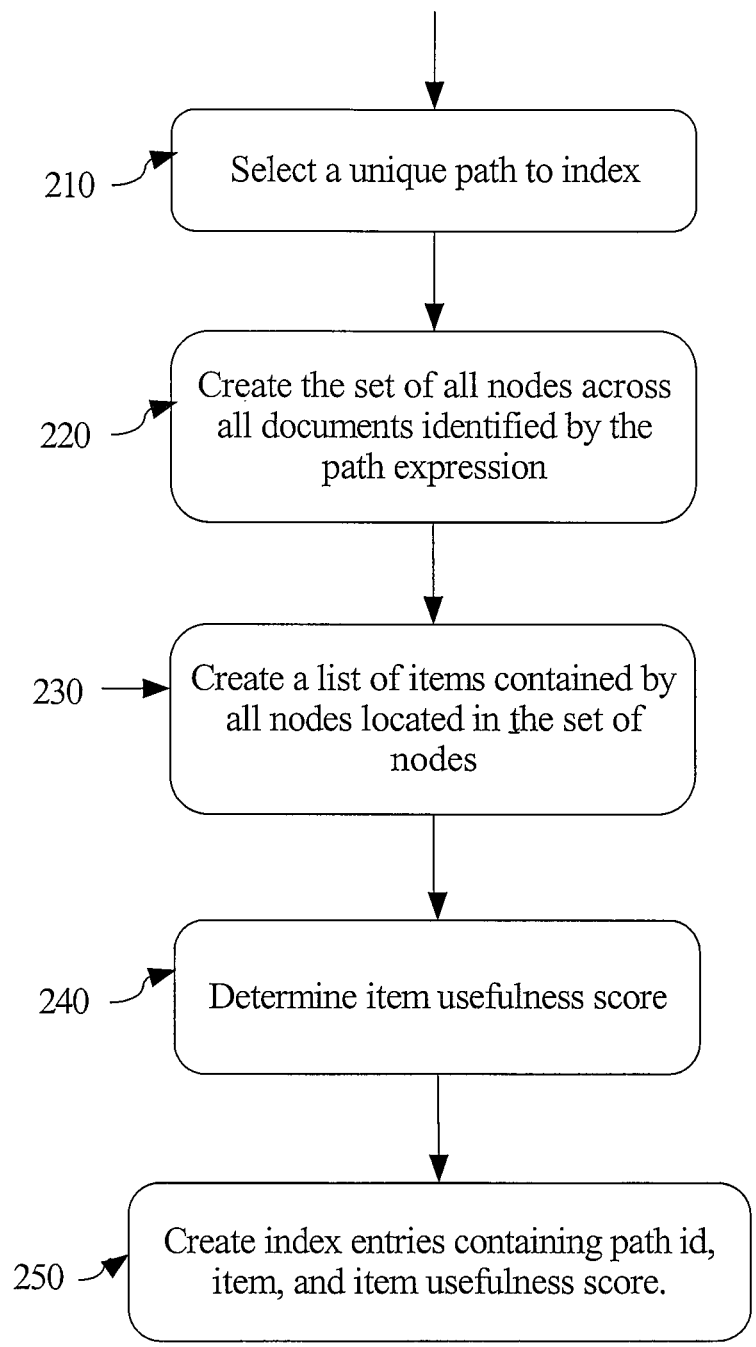

```
<resume>
    <fullname>
        <firstname>Scott</firstname>
        <lastname>Brown</lastname>
    <project>Implemented Java compiler</project>
    <skill>Java</skill>
    <skill>C</skill>
</resume>
<resume>
    <fullname>
        <firstname>David</firstname>
        <lastname>Smith</lastname>
    <project>C compiler optimization</project>
    <skill>C</skill>
    <skill>Java</skill>
</resume>
```

| PathId | Pathname |
|---|---|
| 1 | /resume |
| 2 | /resume/fullname |
| 3 | /resume/fullname/firstname |
| 4 | /resume/fullname/lastname |
| 5 | /resume/project |
| 6 | /resume/skill |

FIG. 3

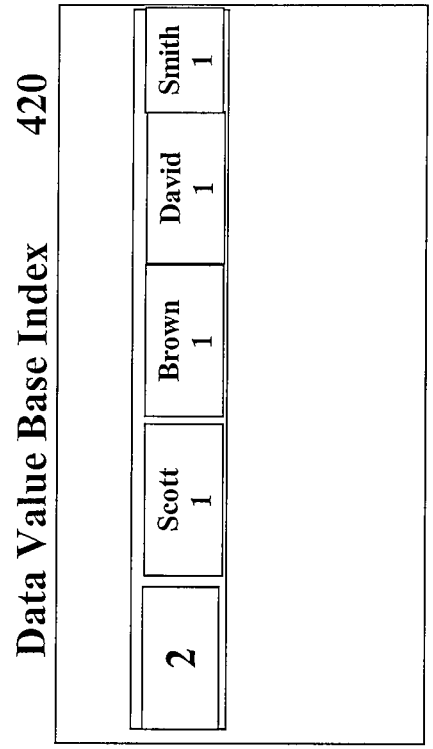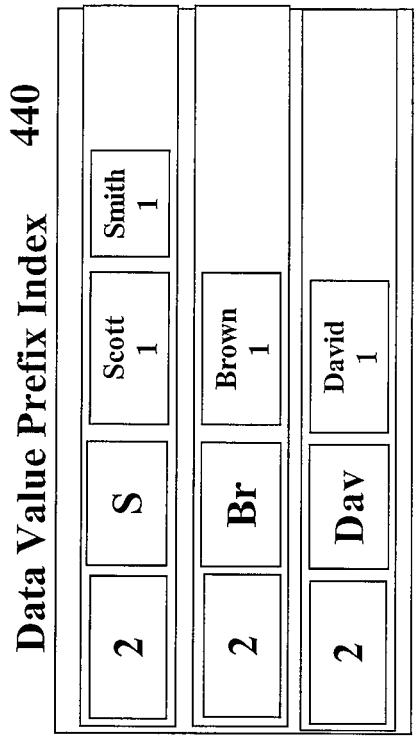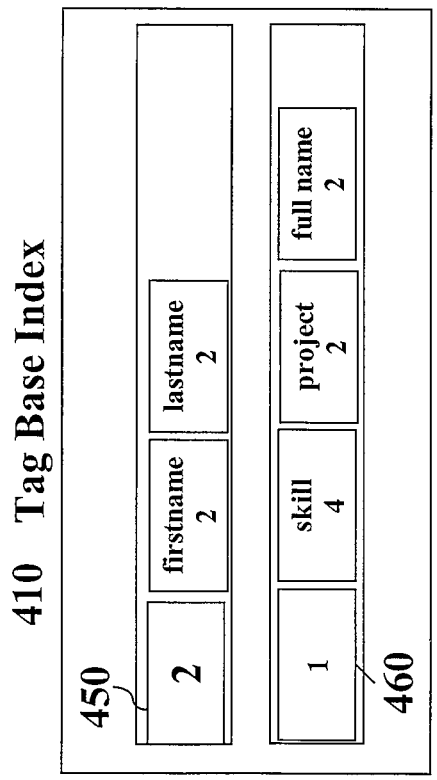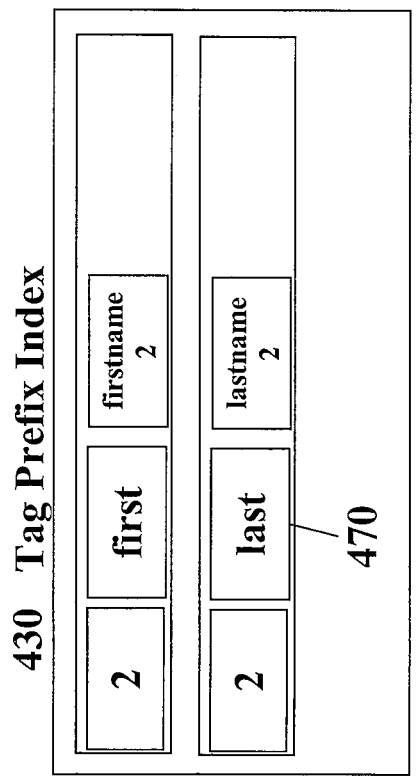
FIG. 4

MECHANISMS FOR EFFICIENT AUTOCOMPLETION IN XML SEARCH APPLICATIONS

RELATED CASES

The present application is related to U.S. application Ser. No. 10/884,311, filed on Jul. 2, 2004, which is incorporated herein by reference.

FIELD OF THE INVENTION

The techniques presented herein are directed towards providing support for users searching for XML tags and data within a collection of XML documents.

BACKGROUND OF THE INVENTION

A search engine helps a user to locate information. Using a search engine, a user can enter one or more search query terms and obtain a list of resources that contain or are associated with subject matter that matches those search query terms. While search engines may be applied in a variety of contexts, search engines have been used especially for locating resources that are accessible through the Internet.

XML (eXtensible Markup Language) is becoming increasingly popular as the format for describing and storing data. Thus, providing support for searching XML documents is an extremely important problem for modern user search engines. XML documents have a hierarchical structure. Search engines that locate resources on the Internet cannot rely on the structure of the web pages being searched, and thus are not well-suited to take advantage of the structure for performing the search. The documents searched by an Internet search engine are treated as just sequence of bytes, and there is no distinguishing between meta-data indicating structure and the document content.

XML elements are delimited by a start tag and a corresponding end tag. For example, in the following XML fragment, <Author> is a start tag and </Author> is an end tag to delimit an element.

```
<book>My book
    <publication publisher="Doubleday"
        date="January"></publication>
    <Author>Mark Berry</Author>
    <Author>Jane Murray</Author>
</book>
```

The data between the element start and end tags is referred to as the element's content. An element's content may include values and other elements. In the case of the Author element, the content of the element is the text data value Mark Berry. In the case of the Book element, the content includes the value My Book and the elements publication and two Author elements. An element is herein referred to by its element name. For example, the element delimited by the start and end tags <publication> and </publication> is referred to as publication.

Information about the structure of specific types of XML documents may be specified in documents referred to as "XML schemas". For example, the XML schema for a particular type of XML document may specify the names for the data items contained in that particular type of XML document, the hierarchical relationship between the data items contained in that type of XML document, data types of the data items contained in that particular type of XML document, etc. In addition to wanting to search for data values contained within a collection of XML documents, users may find it useful to be able to search and discover the structure of the documents as well. Internet search engines do not provide the user the ability to search for elements of the structure of the document, such as for tag names.

Node Tree Model

An important standard for XML is the XQuery 1.0 and XPath 2.0 Data Model. (see W3C Working Draft 9 Jul. 2004, which is incorporated herein by reference) One aspect of this model is that a XML document is represented by a hierarchy of nodes that reflects the hierarchical nature of the XML document. A tree hierarchy of nodes is composed of nodes at multiple levels. Nodes at the same level are sibling nodes. In a tree hierarchy or node tree, each child node has only one parent node that resides at a higher level than the child node, but a parent node may have multiple child nodes residing at a lower level than the parent node. In a tree hierarchy, the root node is one that has no parent node, and a leaf node has no child nodes. A tree hierarchy has a single root node.

In a node tree that represents a XML document, a node can correspond to an element. The child nodes of the node correspond to an attribute or another element contained in the element.

The node may be associated with a name. For example, the name of the node representing the element book is book. For a node representing the attribute publisher, the name of the node is publisher.

For convenience of expression, elements and other parts of a XML document are referred to as nodes within a tree of nodes that represents the document. Thus, a node representing an element may be referred to by the element name, and a node value may be referred to as the element value. For example, referring to 'My book' as the value of the node with the name book is just a convenient way of expressing that the value of the element associated with node book is My book. The name of an element, attribute, or node is also referred to herein as a tag name.

The path for a node in a XML document is the series of nodes, starting from an ascendant node in a XML document to arrive at a particular node further down in the hierarchy. For example, the path from the root of XML document to node publication is represented by '/book/publication'.

Path Expressions

XML documents may be searched by using an XML query language such as XQuery/XPath. XML Query Language ("XQuery") and XML Path Language ("XPath") are important standards for a querying data in XML documents. The primary syntactic construct in XPath is an expression, which is evaluated to yield an object. XPath expressions are described in Section 3 ("Expressions") of "XML Path Language (XPath)" (version 1.0). A path is a location of a node within an XML document hierarchy; a path expression is a representation of (a way of expressing or specifying) that location. Constructing a path expression may require that the user know the structure of the document. Thus, when the collection of XML documents does not have a schema that expresses their structure, or there is not one common schema to which all XML documents in the collection conform, it can be difficult using XQuery/XPath to formulate a query to find information in those documents.

What is needed is a way to provide assistance to users wanting to search a collection of XML documents when the user does not have complete knowledge of the documents' structure. Such an approach can be used for targeting the search to a particular portion of the XML hierarchy.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram showing the steps for building an index of XML tags or data that can be used for auto-completion.

FIG. 3 is an example document set and corresponding path id table.

FIG. 4 is a diagram illustrating the structure of a partially-constructed set of indices corresponding to the example in FIG. 3 for one embodiment.

DETAILED DESCRIPTION OF THE INVENTION

Overview

The following techniques provide support for users searching for data stored in a collection of XML documents. Often, in order to find such data, knowledge of the structure of the XML documents is needed. The techniques also provide support for users to search for XML tags when the documents' structure is not known to the user.

One way to help users searching for content with only partial knowledge of how to specify the search is to provide auto-completion. Auto-completion involves predicting a word or phrase that the user wants to type in without the user actually typing the entire word or phrase. The words that may complete the user's partially entered search term may be presented to the user sorted in order of the predicted usefulness to the user.

Figure 1:
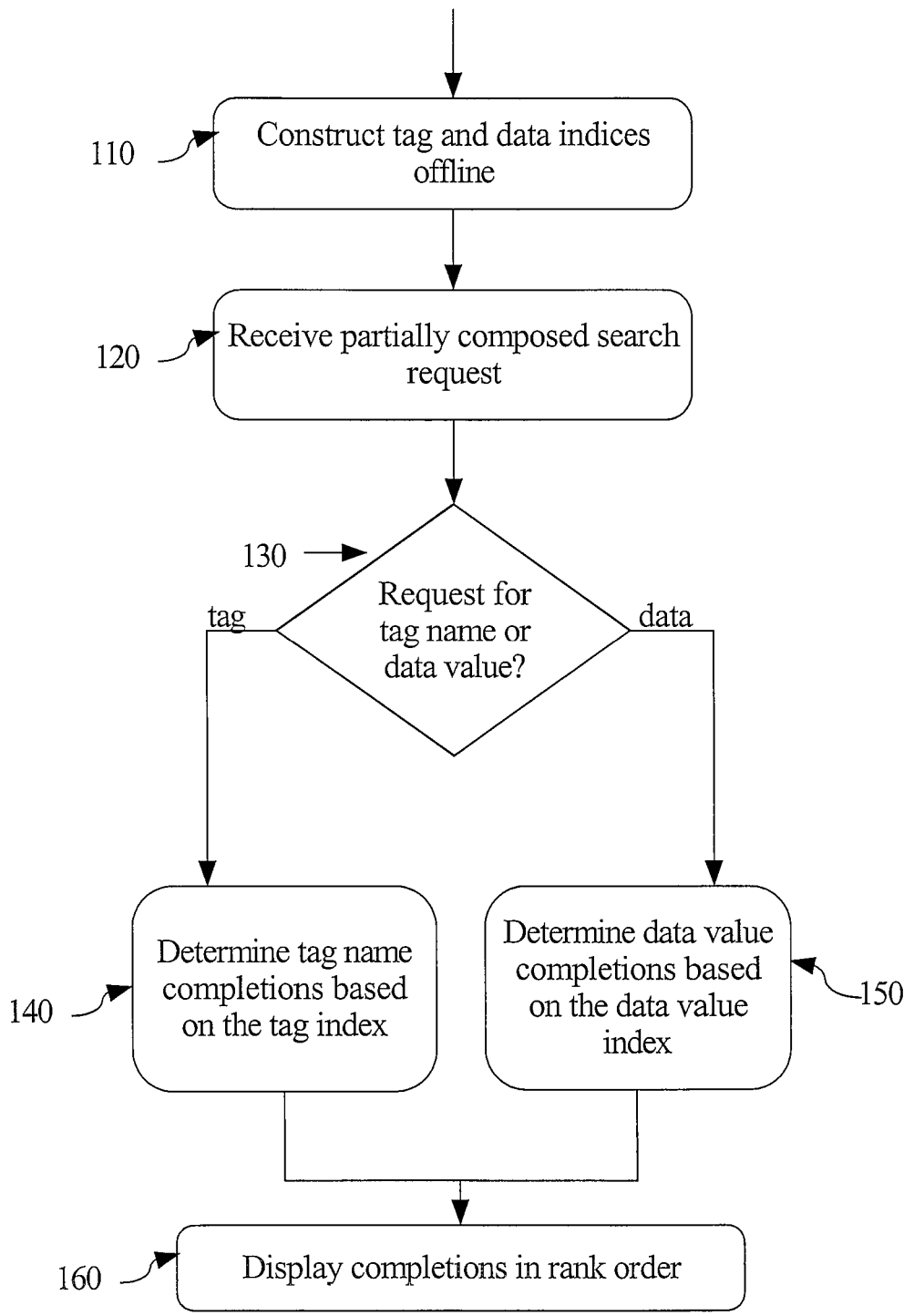
FIG. 1 is a flow diagram showing an overview of the steps for providing auto-completion of XML tags and data values to a user.

Providing an XML context-sensitive, auto-completion capability for a user searching for tags and data in a collection of XML documents involves several steps as shown in FIG. 1. First, one or more indices are constructed over the collection of documents that index the XML tags and data contained within the nodes of each document (Step 110). Once the indices are created, users can type in a path context and a partially completed search term (Step 120). Unlike searching documents in the internet, the mechanism allows for constraining the search to particular nodes in the document hierarchy. Thus, a search can be performed for only those tag names or data values contained in certain nodes, and not within the entire document. The user-supplied path context identifies the set of nodes in which the search may take place.

In Step 130, the search engine determines whether a tag completion or a data value completion is requested. Steps 140 and 150 uses the indices to determine a set of tag or data completions respectively that would complete the partially-completed user-specified search term. The search engine then displays the completions in rank order of their score (Step 160).

Users who are completely unaware of the structure of the data may search within the path context of the document root (i.e., search all nodes in the documents). However, users having only partial information may specify a known path context and use auto-completion to show the list of XML tags at the next level of the hierarchy. A tag selected by auto-completion can be added to the path context, resulting in displaying the tags within the next layer of the hierarchy. In this way, a user can navigate the hierarchy without knowing the complete structure before starting to search. The set of possible tag completions is scored based on various factors that may include the number of occurrences (frequency) of the tag in nodes within the current path context. A particular tag might have a different frequency within a particular context than in the document as a whole, and thus, the relative scores of tags are dependent on the context in which the tags are searched.

Once users have chosen a complete path context in which to search for data values contained within the nodes, the user can type a partially completed text string, and auto-completion values will be displayed that are contained within the nodes of the specified path context and that start with the characters of the partially completed text string. The completions are ordered based on their score relative to that path context when displayed to the user.

Creating an index for tag completions is similar to creating an index for data value completions. Although indices for tags and data values are logically separate, the physical storage of the index may be combined or separate. However, the scoring function that provides a ranking for tag completions may be different from the scoring function that ranks text completions. Thus, there may be a distinction between how tags and data values are treated within the system.

Knowledge of XML document structure gives this approach special features including the ability to provide auto-completion support for tag names and context-sensitive searching for data within a collection of XML documents. Context sensitivity means that the searching considers the context, or paths that constrain the search. Using this approach, the search for data in a set of XML documents may be constrained to only certain paths within all documents.

Creating the Index of Tag and Data Completions

FIG. 2 shows the steps for creating an index of tag or data value completions. The same process is used for both tags and data, and thus, the steps are described using "item" as a generic word for "tag" or "data." The steps in FIG. 2 are performed for unique paths in a set of XML documents. The first step is to select the set of paths to be processed (Step 210). In Step 220, a set of XML nodes, each identified by the selected paths' path expressions is created across all documents. In one embodiment, a path expression is a path name. From the set of nodes constructed in Step 220, a list comprising the union of all items contained by all nodes in the set is assembled (Step 230). Each item in the list of items is stored in an index entry and a usefulness score is stored in association with each item. (Step 240). The usefulness score for an item may be determined by simply counting the number of occurrences of the item within the path context. However, the scoring function can be any function that assigns a value to an item for the purpose of controlling its rank in the list shown to the user. For example, the usefulness score for an item could be determined by adding together the frequency scores for each document in which the item is found, where the frequency within the document is weighted by the quality of the document by some measure of quality. A link analysis algorithm, such as PageRank, is one specific example of a document weighting function that could be used.

As the final step (Step 250), items are added to an index entry that stores a path expression as the index key, the item, and the item's usefulness score. The path expression stored in the index entry may be a path id or a path name. A path id may be a numeric identifier that serves as an index into a table of path names. This reduces the amount of space needed for the item index entries. To further save space, the numeric identifier may be compressed. Delta compression, for example, may be used to store the numeric identifier as a base+offset representation to store larger path id identifiers in fewer bits. For example, instead of storing the list (1045, 1048, 1055), the list (1045, 3, 7) could be stored where the second and third entries indicate a delta of '3' and '7' relative to their previous values respectively.

In one embodiment, a single index entry is created for each unique path and the index entry contains a list of all items contained within the node at that path stored in order of their usefulness scores. In an alternative embodiment, a separate index entry is created for each item and its usefulness score. Thus, potentially multiple index entries are retrieved when searching for the path expression, and the items contained within the retrieved index entries are sorted in order of their score at lookup time.

There are several choices for how to store the index entries. One way is to store tag index entries in a different index from data index entries. Alternatively, a single index may store both tag and data index entries where the index entry also comprises an indication of whether the entry contains data or tag information.

Caching Pre-Computed Prefix Lookups In An Index

A prefix is a sequence of characters, or a substring, that is completely contained at the beginning of the item. For example, an item named "address" has the following set of prefixes: {a, ad, add, addr, addre, addres, address}. The efficiency of an index lookup can be enhanced by caching popular prefix searches and storing the results of the search in an index entry. When an item prefix is stored in the index entry, only items starting with the prefix may be stored in that entry. A popular prefix may be one in which there are many items within a context that contain the prefix. Alternatively, a popular prefix may be a prefix that is frequently specified as the partially completed search string by users. In one embodiment, a separate prefix index is created and consulted separately from the base index described above. In an alternative embodiment, a single index contains index entries that include an optional item prefix, where the default prefix is the null string.

Creating an index entry that contains an item prefix involves pre-computing an index lookup on a prefix and caching the result along with the prefix in a new index entry. Thus, the work can be done once rather than every time the prefix is looked up. One way to identify frequently searched prefixes is by analyzing query logs. This helps to optimize the overall efficiency of the system. Another way to optimize performance is to ensure that the response time for any particular auto-completion does not exceed a maximum time. This can be done by finding common prefixes among a long list of items. There is a tradeoff between the number of individual prefix index entries that must be searched to find the matching prefix, and the number of items in a non-prefix index entry that would have to individually compared if the prefix were not cached. Thus, the determination of whether to add another prefix index entry may depend on the number of pre-existing prefix entries, the number of the items that would have to be compared if the prefix were not added, and how many comparisons can be made per unit time. If the number of items stored for a particular path id is small, then there is no benefit to storing item prefixes. However, if a very large number of items must be compared on every look-up, then providing item prefixes can shorten the number of comparisons if the list of item prefixes is a small number. The benefit of caching frequently requested prefixes within an index will be explained further below when the use of the index is described in more detail.

In a system supporting prefixes in an index entry, another factor that may be used in the usefulness scoring is the length of the item name relative to the length of the prefix stored in the index entry. In other words, the items that are not much longer than their prefix in the index entry may be assigned a higher score than items that contain proportionately less of the prefix.

FIG. 4 is a diagram showing an example embodiment of a partially-constructed set of indices for the document set and path id table shown in FIG. 3. The document set shown in FIG. 3 includes 2 resumes, one for Scott Brown and the other for David Smith. The path id table shows the numeric representation of the path id assigned to each unique path in the resume structure. FIG. 4 shows separate tag and data indices and separate base and prefix indices. Index 410 is a tag base index comprising a set of index entries, where the key to the index is the path id, and all items within the path represented by the path id are contained within the entry in order of their usefulness score. Index Entry 450 is an index entry for path id 2, which represents the path "/resume/fullname." The tags contained within this path include firstname and lastname. The usefulness score used in this example is a simple occurrence count. firstname and lastname each occur once in each of the two documents, and thus, each tag occurs twice within the context of "/resume/fullname." Similarly, Index Entry 460 is another index entry for the path "/resume." "/resume" contains tags fullname, project, and skill. skill is listed first because skill is found twice in each of both documents in the "/resume" path; therefore, skill is listed first because its usefulness score is greater than the scores for project and fullname.

Index 420 is a data value base index that comprises index entries for the data values contained within XML nodes. The only entry constructed in the example is for the data values contained within the path "/resume/fullname" which comprises Scott, Brown, David, and Smith. Each data value occurs only once across all documents.

Index 430 is a tag prefix index. The prefix indices use both the path id and the prefix as keys into the index. The index entries in Index 430 differ from the index entries in Index 410 in that the entries in Index 430 hold a tag prefix. All tags listed in the entry start with the prefix stored in the entry. For example, Index Entry 470 represents the tags within "/resume/fullname" with a prefix of last. lastname is the only one tag with the prefix last, and therefore, is the only tag stored in the index entry. Index 440 is a data value prefix index that holds prefix index entries for data values.

Using the Indices to Provide Auto-Completion

A user interacting with the system types in a completed path context and a partially-completed search string which are the beginning characters of an item, also called a prefix for the item. The item may be an XML tag or data. The steps for looking up an item in the index may be the same for both tags and data; however, the system might need to know whether the item is a tag or data. One embodiment for providing the system with information regarding whether a tag or data name is being sought is to have two separate text entry fields: one for entering path names (context) and one for entering data values. In the context text box, the user may type a path name, where each tag name is surrounded by a slash ("/"). Any tag name ending with a slash is interpreted as belonging to the completed path context, and a tag name that is not yet completed is interpreted as a partially-completed tag name, and thus, is a candidate for auto-completion. The data value text box is not activated until a complete path name is specified. All text strings typed into the data text box candidates for auto-completion.

In the next section, the steps for index lookup are described for index entries that do not contain item prefixes.

Looking Up Partial Completions in Index Entries Without Prefixes

Figure 5:
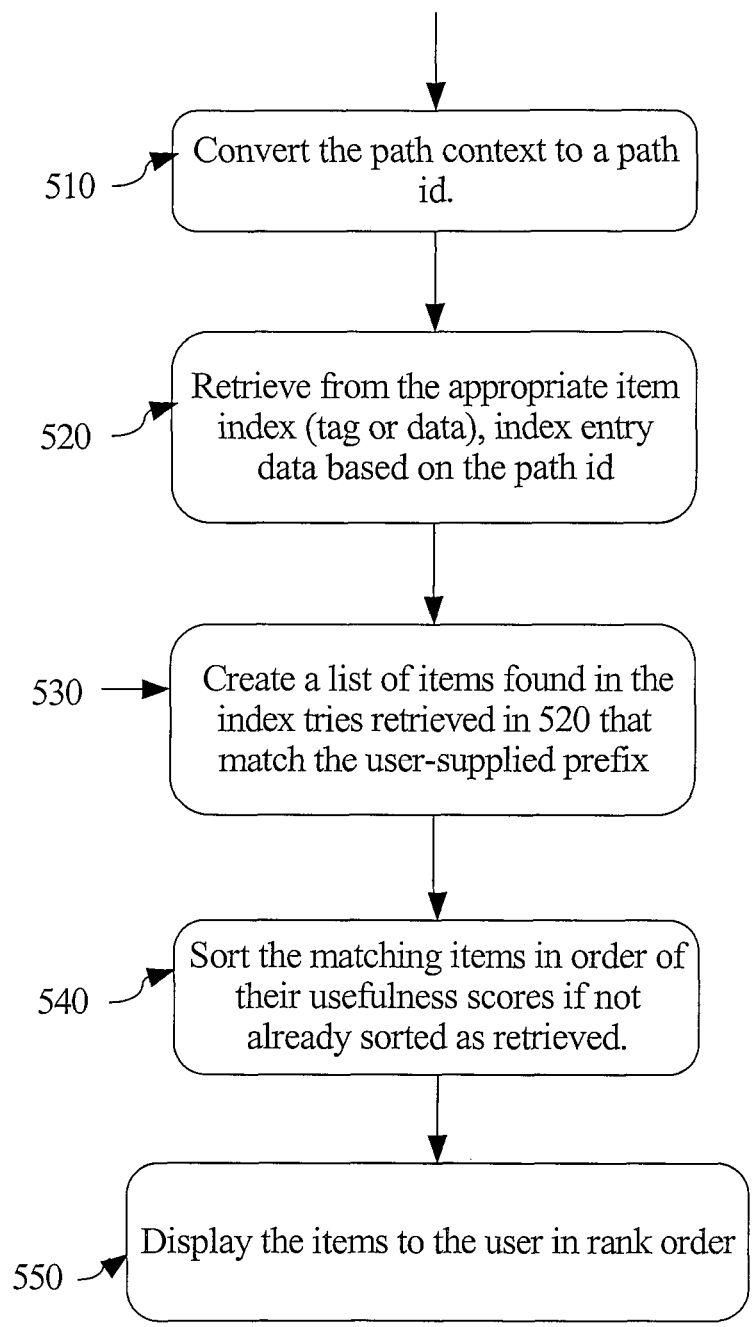
FIG. 5 is a flow diagram showing the steps of using a tag and/or data value base index for retrieving items.

FIG. 5 is a flow diagram showing the steps for looking up item prefixes in the index when an index entry either does not include an item prefix or the item prefix is the root node. In Step 510, the user-supplied completed path context is converted to a path id. In Step 520, the path id is used to lookup all of the index entries that contain the path id. The union of all such index entries contains all the items that can be found within the user-supplied context path in the collection of documents. The choice of index to use for looking up the path id may depend upon whether the desired item is a tag or data. For example, if the text entered into the context text box does not end in a "/", then the text box contents may be parsed into two parts: the completed path context end in the final "/" and a partially completed tag prefix. In this case, the desired item is a tag. If the contents of the text box ends in a "/", then the entire text box contents may be considered the completed path context, and the contents of the data text box may be considered the partially completed data value prefix. In this case, the desired item would be data.

The partially completed item typed by the user, but not yet submitted to the search engine is a prefix for fully completed item names that are found in the specified path context. In Step 530, the user-provided prefix is compared against all the items retrieved from the index. Those index items starting with the user-provided prefix are said to "match" the prefix. For example, if the user-provided prefix is "ad," the prefix will match "add" and "address," but not "a" or "at." The set of matching index items are processed further in Step 540, where the items are sorted in order of the usefulness score that was stored in the index entry in association with each item. For embodiments where the items are stored in sorted order, no further sorting is needed at retrieval time. In Step 550, the list of matching items is displayed to the user in rank order with the (predicted) most useful item shown at the top of the list.

Looking Up Partial Completions in Index Entries Containing Prefixes

Figure 6:
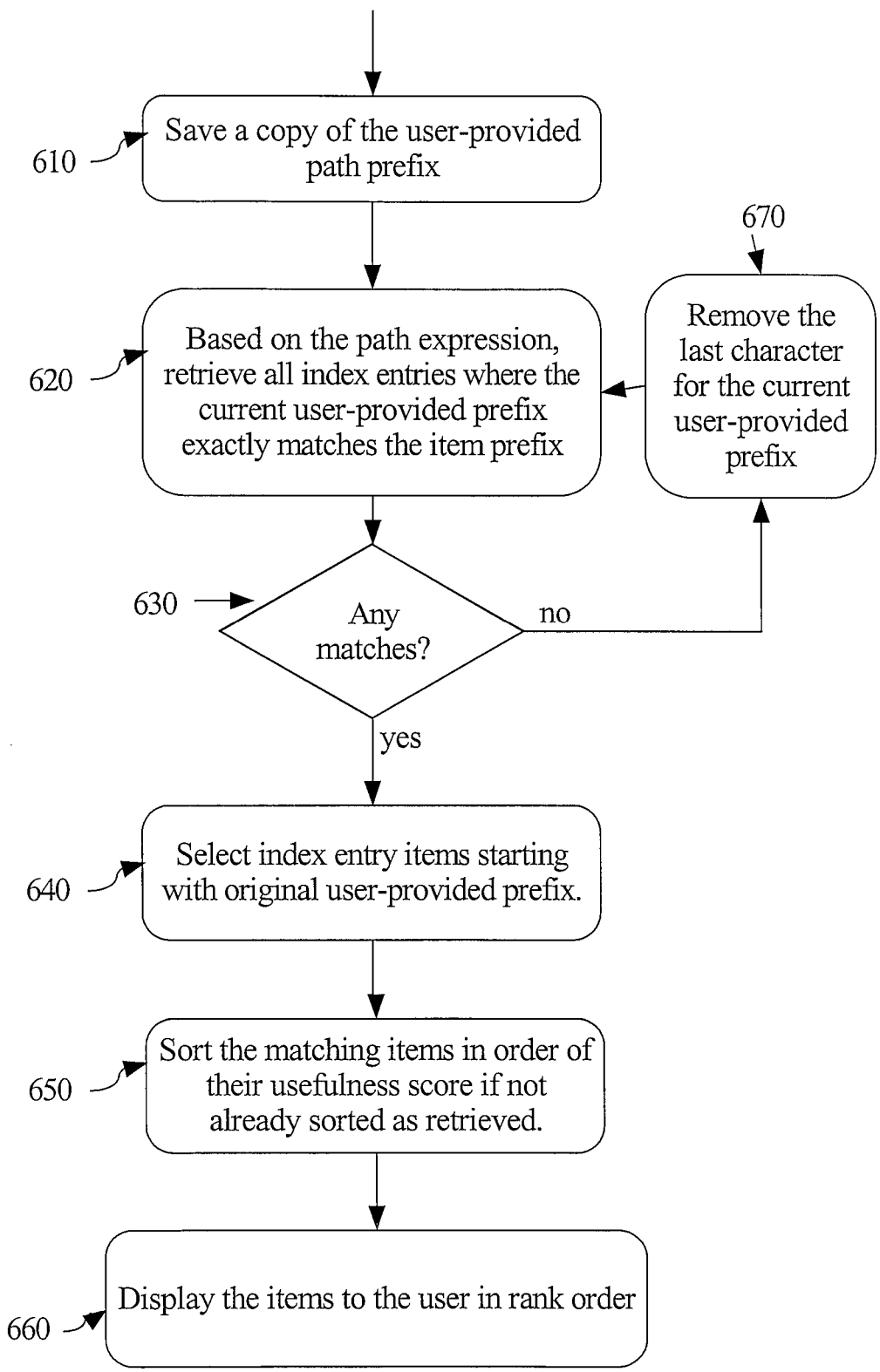
FIG. 6 is a flow diagram showing the steps of using a tag and/or data value prefix index for retrieving items.

FIG. 6 shows additional steps needed to take advantage of indices that store non-null item prefixes in an index entry. In Step 610, the user-provided prefix is saved away, and a copy of the prefix is stored in a current user-provided prefix. In Step 620, the path expression and current user-provided prefix are used to lookup all index entries that have item prefixes stored that exactly match the current user-provided prefix. For example, if the current user-provided prefix is "ad," then only index entries containing an item prefix "ad" will match exactly. Index entries containing a prefix of "a" or "add" will not match. In Step 630, a test is performed to see if any index entries contain a matching item prefix.

If no index entry matches are found in Step 630, then Step 670 is performed. The last character of the current user-provided prefix is removed to form a new, shorter current user-provided prefix. The process is repeated using the new current prefix until a match is found or no more characters remain in the current prefix.

Once a match has been found, Step 640 is performed. All of the items stored in the matching index entries start with the prefix in their index entry. When the original user-provided path prefix exactly matches the index entry prefix, and no further matching needs to be done between the user-provided prefix and the individual index entry items. The work of testing the item prefix against the items was done when the index entry was created, and does not need to be repeated on every lookup. However, if the matching index entry prefix does not exactly match the original user-provided prefix, then the individual index entries must be compared against the original user-provided prefix to select only those entries that match the entire user-provided prefix. For example, if the user-provided prefix is addr, but the matching index entry prefix is ad, and the index entry has items address and administrator, address would be selected, but administrator would not. Even though the individual index entries still need to be compared to the original user-provided prefix to select only appropriate items, every item in the list is pre-filtered to start with the shorter prefix, and thus there may be fewer items to test than when searching index entries that do not use prefixes.

In Step 650, the items from the matching index entries are sorted in the order of their usefulness score if the items are not already stored in sorted order, and in Step 660 the items are displayed for the user in rank order. If at least one index entry matches, then no further processing needs to take place. When an item prefix is stored in an index entry, all items containing that prefix will be stored in an index entry with that prefix, and thus, searching for other items in other index entries is unnecessary.

If no match is found and the current prefix is empty, then this process ends and the process described in FIG. 5 is performed.

Hardware Overview

Figure 7:
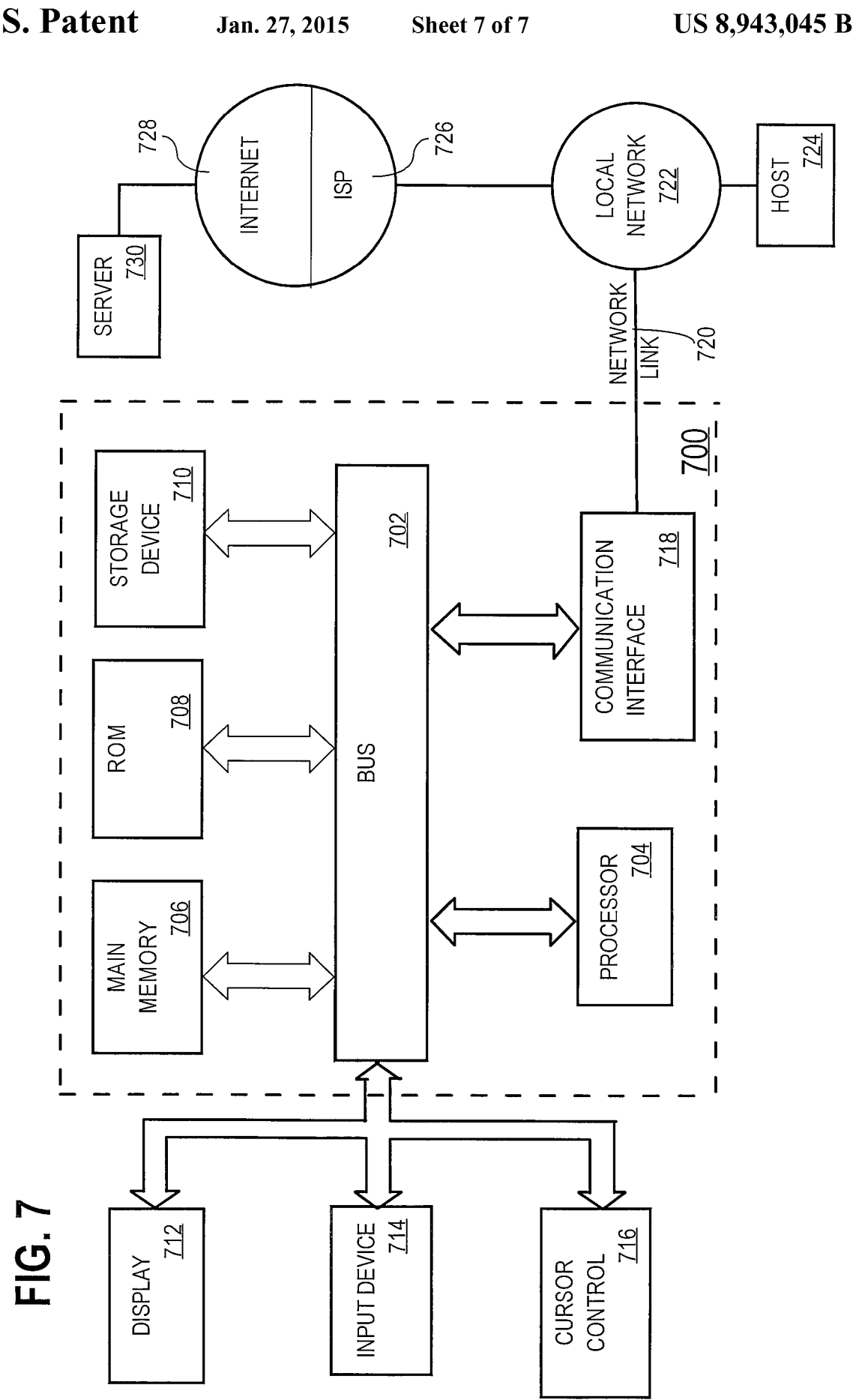
FIG. 7 is a block diagram of a computer system that may be used in an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    receiving a path context and a search string for a tag name in a collection of XML documents;
    determining an ordered set of tag name completions, wherein each tag name completion of said ordered set of tag name completions matches said search string and corresponds to a matching tag name of a respective set of nodes that are contained within said path context, said matching tag name of the respective set of nodes having a number of occurrences equal to a number of nodes in the respective set of nodes;
    wherein said ordered set of tag name completions has an order based on the number of occurrences of each matching tag name corresponding to a tag name completion of the ordered set of tag name completions; and displaying the ordered set of tag name completions in the order.

2. A computer-implemented method comprising:
receiving a search string for a node value in a collection of XML documents;
wherein said search string includes a path context and a prefix for the node value;
determining an ordered set of node value completions based on a set of nodes and the prefix, wherein a hierarchical position within an XML document of a node in the set of nodes is specified by the path context;
wherein said set of node value completions includes node values that are contained by a node in the set of nodes and start with the prefix; and
displaying the ordered set of node value completions in order.

3. A computer-implemented method comprising:
receiving a path context and a user-specified prefix for an item, wherein the item is one of an XML tag or a node value;
retrieving a set of index entries, wherein each index entry of the set of index entries contains a path expression, an item, and a score value;
constructing an ordered list of items based on the set of index entries, said ordered list of items being ordered based on the respective score values of the set of index entries;
wherein for each item in the ordered list of items, there is a corresponding index entry of the set of index entries, wherein the corresponding index entry contains the path expression;
wherein the item in the corresponding index entry starts with the user-specified prefix;
storing the ordered list of items in a volatile or non-volatile computer-readable memory.

4. The method of claim 3, wherein each index entry of the set of index entries further comprises an item prefix for the item contained in the index entry;
and
wherein constructing the ordered list of items further includes selecting certain one or more index entries, wherein the user-specified prefix starts with the item prefix contained by said each index entry.

5. The method of claim 4, wherein the user-specified prefix exactly matches the item prefix contained by said each index entry; and
wherein constructing the ordered list of items includes adding every item from said certain one or more index entries to the ordered list of items.

6. The method of claim 4, wherein:
in response to determining that the user-specified prefix does not match any item prefix in an index entry of the set of index entries, removing one or more characters from an end of the user-specified prefix to form a shorter user-specified prefix;
determining whether the shorter user-specified prefix matches an item prefix stored in an index entry of the set of index entries;
in response to determining that the shorter user-specified prefix matches an item prefix stored in an index entry of the set of index entries:
selecting a set of selected items contained in the one or more index entries that start with the user-specified prefix; and
adding each selected item of the set of selected items to the ordered list of items.

7. The method of claim 6, further comprising:
in response to determining that the user-specified prefix for an item does not match any item prefix in an index entry of the set of index entries,
creating a new index entry containing the user-specified prefix and the ordered list of items.

8. A non-transitory computer-readable storage medium storing one or more sequences of instructions which, when executed by one or more processors, cause:
receiving a path context and a search string for a tag name in a collection of XML documents;
determining an ordered set of tag name completions, wherein each tag name completion of said ordered set of tag name completions matches said search string and corresponds to a matching tag name of a respective set of nodes that are contained within said path context, said matching tag name of the respective set of nodes having a number of occurrences equal to a number of nodes in the respective set of nodes;
wherein said ordered set of tag name completions has an order based on the number of occurrences of each matching tag name corresponding to a tag name completion of the ordered set of tag name completions; and
displaying the ordered set of tag name completions in the order.

9. A non-transitory computer-readable storage medium storing one or more sequences of instructions which, when executed by one or more processors, cause:
receiving a search for a node value in a collection of XML documents;
wherein said search string includes a path context and a prefix for the node value;
determining an ordered set of node value completions based on a set of nodes and the prefix, wherein a hierarchical position within an XML document of a node in the set of nodes is specified by the path context;
wherein said set of node value completions includes node values that are contained by a node in the set of nodes and start with the prefix; and
displaying the ordered set of node value completions in order.

10. A non-transitory computer-readable storage medium storing one or more sequences of instructions which, when executed by one or more processors, cause:
receiving a path context and a user-specified prefix for an item, wherein the item is one of an XML tag or a node value;
retrieving a set of index entries, wherein each index entry of the set of index entries contains a path expression, an item, and a score value;
constructing an ordered list of items based on the set of index entries, said ordered list of items being ordered based on the respective score values of the set of index entries;
wherein for each item in the ordered list of items, there is a corresponding index entry of the set of index entries, wherein the corresponding index entry contains the path expression;
wherein the item in the corresponding index entry starts with the user-specified prefix;
storing the ordered list of items in a volatile or non-volatile computer-readable memory.

11. The non-transitory computer-readable storage medium of claim 10, wherein each index entry of the set of index entries further contains an item prefix for the item contained in the index entry; and wherein constructing the ordered list of items further includes selecting certain one or more index entries, wherein the user-specified prefix starts with the item prefix contained by said each index entry.

12. The non-transitory computer-readable storage medium of claim 11,
wherein the user-specified prefix exactly matches the item prefix contained by said each index entry; and
wherein constructing the ordered list of items includes adding every item from said certain one or more index entries to the ordered list of items.

13. The non-transitory computer-readable storage medium of claim 11, wherein the one or more sequences of instructions, when executed by the one or more processors, further cause:
in response to determining that the user-specified prefix does not match any item prefix in an index entry of the set of index entries, removing one or more characters from an end of the user-specified prefix to form a shorter user-specified prefix;
determining whether the shorter user-specified prefix matches an item prefix stored in an index entry of the set of index entries:
in response to determining that the shorter user-specified prefix matches an item prefix stored in an index entry of the set of index entries:
selecting a set of selected items contained in the one or more index entries that start with the user-specified prefix; and
adding each selected item of the set of selected items to the ordered list of items.

14. The non-transitory computer-readable storage medium of claim 13, wherein the one or more sequences of instructions, when executed by the one or more processors, further cause:
in response to determining that the user-specified prefix for an item does not match any item prefix in an index entry of the set of index entries, creating a new index entry containing the user-specified prefix and the ordered list of items.

* * * * *

UNITED STATES PATENT AND TRADEMARK OFFICE
CERTIFICATE OF CORRECTION

| | | |
|---|---|---|
| PATENT NO. | : 8,943,045 B2 | Page 1 of 1 |
| APPLICATION NO. | : 12/360919 | |
| DATED | : January 27, 2015 | |
| INVENTOR(S) | : Murthy | |

It is certified that error appears in the above-identified patent and that said Letters Patent is hereby corrected as shown below:

In the Claims

In column 11, lines 61-62, in Claim 6, delete "entry entry" and insert -- entry --, therefor.

In column 12, line 30, in Claim 9, delete "search" and insert -- search string --, therefor.

In column 14, line 3, in Claim 13, delete "entries:" and insert -- entries; --, therefor.

Signed and Sealed this
Twenty-fourth Day of November, 2015

Michelle K. Lee
*Director of the United States Patent and Trademark Office*